US006179253B1

(12) United States Patent
Cotton

(10) Patent No.: US 6,179,253 B1
(45) Date of Patent: Jan. 30, 2001

(54) MARINE INSTRUMENT DISPLAY MOUNT

(76) Inventor: R. Gene Cotton, P.O. Box 12475, Alexandria, LA (US) 71315

(*) Notice: Under 35 U.S.C. 154(b), the term of this patent shall be extended for 0 days.

(21) Appl. No.: 09/021,428

(22) Filed: Feb. 10, 1998

(51) Int. Cl.⁷ .................................................. G12B 9/00
(52) U.S. Cl. ................................... 248/27.1; 296/37.12
(58) Field of Search ................................. 248/27.1, 688, 248/127, 146, 346.01, 346.03, 27.3; 180/90; 296/37.12

(56) References Cited

U.S. PATENT DOCUMENTS

| | | | |
|---|---|---|---|
| 3,689,013 | * | 9/1972 | Neugebauer .................. 248/27.1 |
| 4,309,012 | * | 1/1982 | Fukunaga ....................... 248/27.1 |
| 4,858,067 | * | 8/1989 | Rochelle et al. ................. 361/331 |
| 5,865,403 | * | 2/1999 | Covell .............................. 248/27.1 |

* cited by examiner

Primary Examiner—Anita M. King
(74) Attorney, Agent, or Firm—Garvey, Smith, Nehrbass & Doody, LLC

(57) ABSTRACT

A marine instrument display mount is provided for displaying an electrically powered marine instrument (for example, GPS plotter, depth finder, autopilot, radio, etc.) on the dashboard of a boat with a dashboard opening through which electrical cables pass that are used for powering the instrument. The apparatus includes a small footprint base or foot having a perimeter wall and an interior. The foot has a bore through which the electrical cables can pass for powering the marine instrument. The bore includes a vertical conduit portion that is preferably attached to the bottom plate of the foot, the conduit forming a dam that prevents water from entering the opening the opening through which the cables pass. An enlarged housing is supported above the foot and extends laterally to each side of the foot. This enables the housing to hold large marine instruments that can be much wider than the foot, especially important when dashboard space is at a premium or is minimal. The housing provides attachments for removably mounting the instrument to the housing drain channels on the lower end portion of the housing cooperate with the interior of the foot for channeling rain water, sea spray and the like to the foot for drainage therefrom.

20 Claims, 2 Drawing Sheets

MARINE INSTRUMENT DISPLAY MOUNT

CROSS-REFERENCE TO RELATED APPLICATIONS

Not applicable

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to the mounting of marine instruments such as depth finders, Global Positioning System (GPS) plotters, autopilots and the like. Even more particularly, the present invention relates to an improved housing for supporting a marine instrument with a small footprint on a dashboard, wherein any water (such as rainwater, sea spray, etc.) is collected and channeled away from electrical supply cables that power the instrument.

2. General Background of the Invention

Many marine instruments are supported on the dashboard of a boat or vessel so that they can be viewed by the pilot. These marine instruments include depth finders, radios, GPS type plotters and position indicators; autopilots and the like. While many of these instruments provide a water tight or water proof housing, they are all supplied with electrical cables that typically fit sockets on the back of the instrument. Further, these electrical cables must communicate with the electrical system of the boat which is typically behind the dashboard in a dry location.

In order to supply electricity to dashboard mounted marine electronics, an opening must be drilled through the dashboard next to the dashboard location where the marine instrument is attached by bolting, for example.

Many marine instruments are mounted on a U-shaped yoke that affixes to the sides of the marine instrument with thumb wheels, screws, or knobs. The U-shaped yoke or cradle has slots or openings that form a connection with the thumb wheel, thumb screw, bolt, knob or the like. The yoke or cradle is secured to the dashboard of the boat with screws, bolts, or the like. Many of these yolks, cradles, and like supports have a very wide footprint, at least as wide as the instrument and sometimes slightly wider than the instrument. Further, most of these yolks simply provide an opening or port through which wires can pass or in fact no such opening is provided so that the wires or cables must pass through an opening in the dashboard immediately next to the yolk or cradle.

Openings through the dashboard of the boat are a source of concern to a boat owner because water, possibly salt water, can reach the dashboard of the boat during use and enter the area behind the dashboard which typically is covered with crowded electrical components, terminals, and the like.

Most of the yolks and cradles are simply open U-shaped devices that offer no protection whatsoever to the interface that includes the rear of the instrument, the electrical cables that form connections to the instrument at its rear surface, and the opening through which these electrical cables pass.

It is an object of the present invention to provide an improved marine instrument display mount that minimizes the area or "footprint" that the device makes with the dashboard while at the same time providing a large housing area for receiving an instrument of any size and at the same time protecting the delicate electrical cables and their connections that necessarily power the device.

BRIEF SUMMARY OF THE INVENTION

The present invention thus provides an improved marine instrument display apparatus or mount that can be affixed to the dashboard of a boat and next to an opening through the dashboard through which an electrical cable or cables pass for powering the instrument.

The apparatus includes a small footprint base or foot portion having a perimeter wall and an interior.

The foot includes a bore through which one or more electrical cables can pass for powering the marine instrument. The bore communicates with an opening in the dashboard through which the cable or cables pass.

An enlarged housing is supported above the foot, the housing having a rear wall that is inclined, a top wall, a bottom wall, and opposed side walls. This provides an interior of the housing for holding a marine instrument and wherein the housing as attachments for removably mounting the instrument to the housing at the side walls.

The housing and mount have cooperating drain channel portions so that rain water or sea spray that is collected by the housing interior drains into the foot.

The foot preferably provides a plurality of perimeter walls that intersect at 900° surrounding the interior.

The bore is preferably comprised of a vertically extending conduit mounted to a bottom plate of the foot.

The foot thus preferably provides a bottom wall that connects to each of the side walls of the foot thus supporting the conduit at a position spaced inwardly of the sidewalls.

The foot preferably provides a plurality of drain openings that enable water contained within the foot to drain from the foot interior at multiple positions.

The housing bottom wall defines a plane that intersects the housing side walls to form an acute angle therewith.

The housing bottom wall and rear wall define a trough that channels rain water or sea spray into the interior of the foot.

The housing extends laterally to each side of the foot so that a marine instrument that is much wider than the foot can be supported by the apparatus within the enlarged housing.

The trough preferably extends into the foot and away from the foot on each side thereof. The side wall of the foot preferably conforms to the shape of the trough, namely being of a "V-shape" at the intersection of the foot and housing.

BRIEF DESCRIPTION OF THE DRAWINGS

For a further understandings the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 1:
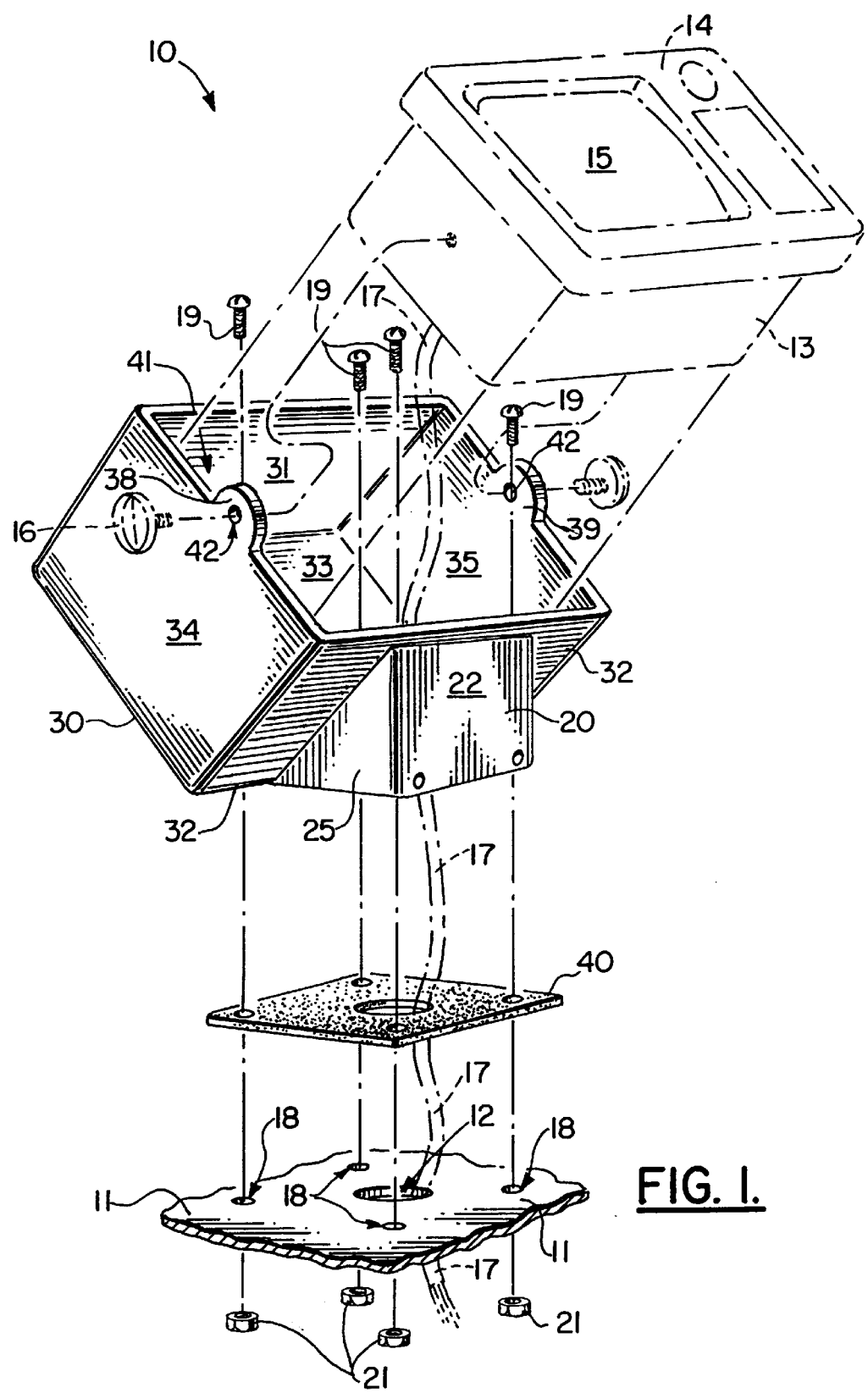
FIG. 1 is an exploded perspective view of the preferred embodiment of the apparatus of the present invention.
Figure 2:
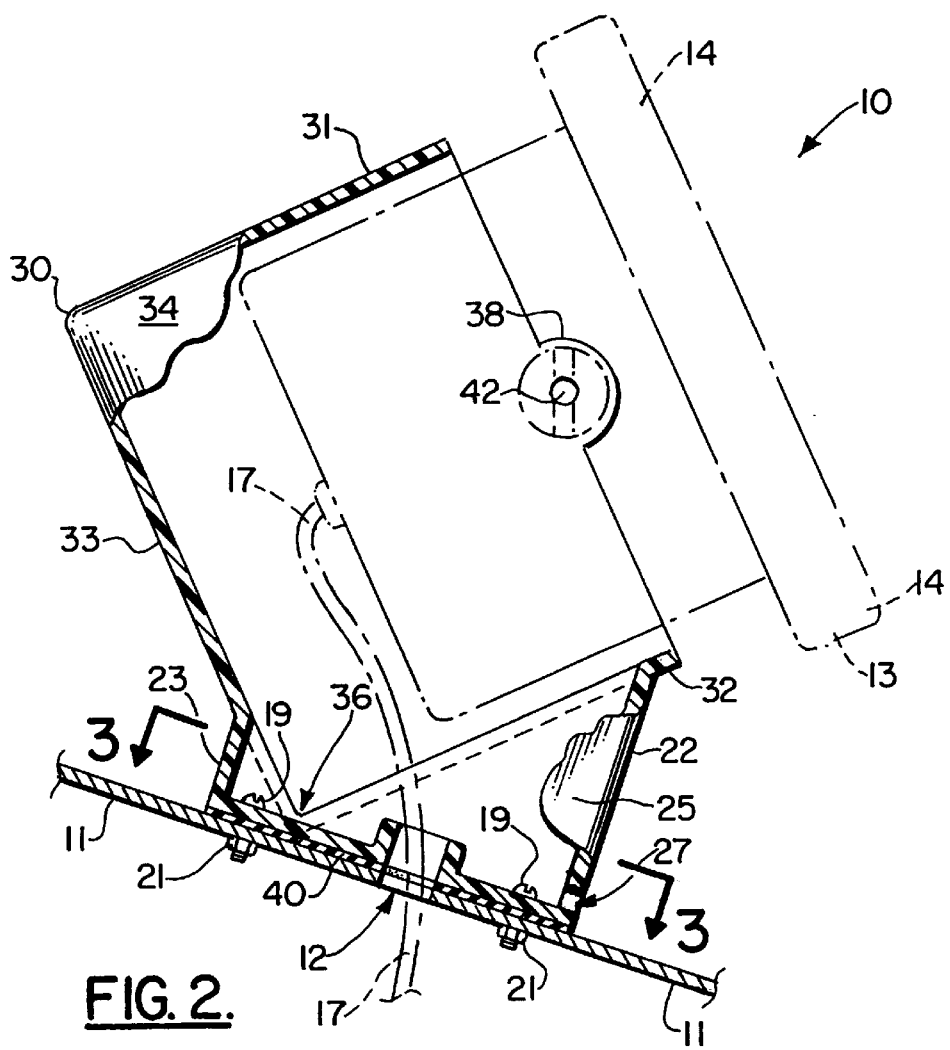
FIG. 2 is a partially broken away side elevational view of the preferred embodiment of the apparatus of the present invention.
Figure 3:
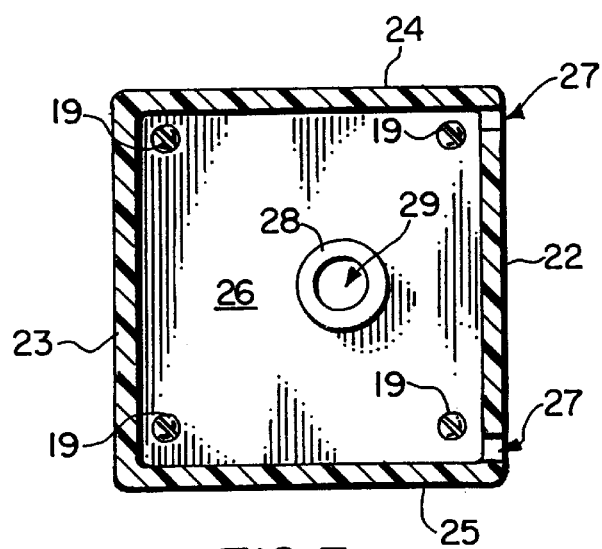
FIG. 3 is a sectional view taken along lines 3—3 of FIG. 2.

FIGS. 1–3 show the preferred embodiment of the apparatus of the present invention designated by the numeral 10 in FIGS. 1 and 2.

Marine instrument display apparatus 10 is preferably used for displaying a marine instrument such as a depth finder, GPS, auto pilot, radio, or the like on the dashboard of a boat having an opening in the dashboard through which electrical power cables pass. Such cables are used to power and operate the marine instrument being displayed.

The dashboard of a boat is designated in FIGS. 1 and 2 by the numeral 11. It should be understood that this is simply a section of the dashboard of a marine vessel that is chosen for locating the apparatus 10. Typically, such a dashboard 11 of a boat can be drilled to provide an opening 12 through which power cables 17 pass, namely those power cables 17 that are used to power the instrument 13. The cables 17 are rigged to the boat's electrical system where they are powered by batteries provided on board.

Instrument 13 typically has a front face 14 that can provide a screen 15 such as in the case of a depth finder, GPS, auto pilot, or the like. The front face 14 and screen 15 define a plane that preferably forms an acute angle with the bottom plate 26 of foot 20 of between about 20° and 70°.

The instrument display apparatus 10 includes a foot 20 that is a smaller portion of the apparatus designed to occupy minimal footprint space on the dashboard 11 of the boat. The foot 20 supports a larger housing 30 that receives the instrument 13. The instrument 13 can be affixed to housing 30 using a pair of opposed knobs 16 that are typically provided on such a marine instrument 13. The knob 16 is typically threadably attached to the instrument 13 so that knobs are loosened, the instrument 13 can be removed from its mount. When the knobs 16 are tightened, the threaded connection between each knob 16 and the instrument 13 functions to clamp or tighten the instrument 13 to its mount, namely housing 30 with the present invention.

A plurality of mounting holes 18 can be provided in dashboard 11, surrounding the cable dashboard opening 12 as shown in FIGS. 1–3. Openings 18 receive bolted connections that each include a bolt 19 and nut 21. A gasket 40 can be placed in between the bottom plate 26 of foot 20 and dashboard 11 as shown in FIGS. 1 and 2.

Foot 20 includes a front wall 22, rear wall 23, and a pair of opposed side walls 24, 25. Each of the walls 22, 23, 24, 25 extends upwardly from bottom plate 26 as shown in FIGS. 2–3. The bottom plate 26 is a planar member that is shaped to conform to the dashboard 11 adjacent to cable opening 12. Bottom plate 26 carries cylindrically-shaped conduit 28 having central bore 29 that is also preferably cylindrically shaped. The cylindrically-shaped bore 29 is preferably sized and shaped to conform to and cover the cable opening 12 in dashboard 11, and to receive cables 16.

Housing 30 includes a top wall 31, bottom wall 32, a rear wall 33, and side walls 34, 35. The bottom wall 32 and rear wall 33 intersect at 90° forming a trough 36 for collecting water such as rain water, sea spray, and the like. The trough 36 then channels any collected water that enters the interior 41 of housing 30 toward the interior 37 of foot 20. Water can then drain from the interior 37 of foot 20 through drain openings 27.

Mounting flanges 38, 39 on housing 30 have slots or openings 42 that form a connection with the threaded rod associated with each of the knobs 16 of instrument 13. Though the threaded rods of each knob 16, they are typically provided with each knob 16 and the instrument 13 as manufactured.

The following table lists the parts numbers and parts descriptions as used herein and in the drawings attached hereto.

PARTS LIST

| Part Number | Description |
| --- | --- |
| 10 | instrument display apparatus |
| 11 | boat dashboard |
| 12 | dashboard opening |
| 13 | marine instrument |
| 14 | front face |
| 15 | screen |
| 16 | knob |
| 17 | cable |
| 18 | hole |
| 19 | bolt |
| 20 | foot |
| 21 | nut |
| 22 | front wall |
| 23 | rear wall |
| 24 | side wall |
| 25 | side wall |
| 26 | bottom plate |
| 27 | drain hole |
| 28 | conduit |
| 29 | bore |
| 30 | housing |
| 31 | top wall |
| 32 | bottom wall |
| 33 | rear wall |
| 34 | side wall |
| 35 | side wall |
| 36 | through |
| 37 | interior |
| 38 | mounting flange |
| 39 | mounting flange |
| 40 | gasket |
| 41 | interior |
| 42 | opening |

The foregoing embodiments are presented by way of example only; the scope of the present invention is to be limited only by the following claims.

What is claimed is:

1. A marine instrument display mount for displaying an electrically powered marine instrument on a boat having a dashboard with an opening through which an electrical cable can pass for powering the instrument, comprising:

a) a foot being configured for attachment to said dashboard and having a perimeter wall and an interior;

b) the foot having a generally vertical conduit with a bore;

c) the boro having a central longitudinal axis;

d) a housing supported by the foot above the foot, the housing having a rear wall that is inclined relative to the bore axis, a top wall, a housing bottom wall and opposed housing sidewalls;

e) the housing having an interior for holding the marine instrument; and f) the housing having attachments for removably mounting the electrically powered marine instrument to the housing.

2. The marine instrument display mount of claim 1 wherein the housing and foot have cooperating drain channel portions so that rain water or sea spray that is collected by the housing interior drains into the foot.

3. The marine instrument display mount of claim 2 wherein the foot has a plurality of perimeter walls surrounding the interior.

4. The marine instrument display mount of claim 2 wherein the foot has a foot bottom wall and the vertically extending conduit is mounted to the foot bottom wall.

5. The marine instrument display mount of claim 1 wherein the foot has a foot bottom wall that supports the housing sidewalls.

6. The marine instrument display mount of claim 5 wherein the foot has one or more drain openings that enable water contained within the foot to drain from the foot interior.

7. The marine instrument display mount of claim 1 wherein the housing bottom wall defines a plane that intersects the housing sidewalls to form an acute angle therewith.

8. The marine instrument display mount of claim 1 wherein the housing bottom wall and rear wall define a trough that channels rain water or sea spray into the interior of the foot.

9. The marine instrument display mount of claim 8 wherein the trough extends into the foot and wherein the housing sidewalls conform to the shape of the trough.

10. The marine instrument display mount of claim 1 wherein the housing extends laterally to each side of the foot.

11. A display mount for displaying an electrically powered marine instrument on a boat having a dashboard with an opening through which an electrical cable can pass for powering the instrument, comprising:
   a) a base support for attachment to said boat dashboard, the base support including a foot with a mounting plate that is a bottom plate surrounded by one or more side walls;
   b) the foot having a bore through which one or more electrical cables can pass for powering the marine instrument, the bore having a central longitudinal axis;
   c) a housing supported by the foot above the foot, the housing having a rear wall that is inclined relative to the bore axis, a top wall, a bottom wall and opposed sidewalls;
   d) the housing having an interior for holding the electrically powered marine instrument; and
   e) the housing having removable instrument attachments for enabling the electrically powered marine instrument to be removably attached to the housing.

12. A marine instrument display mount for displaying an electrically powered marine instrument on the dashboard of a boat with a dashboard opening through which an electrical cable passes for powering the instrument, comprising:
   a) a foot having a perimeter wall and an interior;
   b) the foot having a bottom plate with a hollow conduit having a conduit opening that seals water flow from the foot interior to the conduit opening; and
   c) a drain that enables any water collected in the foot interior to drain from said foot interior.

13. The marine instrument display mount of claim 12 wherein the foot has a front wall, a pair of sidewalls, and a rear wall.

14. The marine instrument display mount of claim 13 wherein the front wall is larger than the rear wall.

15. The marine instrument display mount of claim 13 wherein each foot sidewall has at least one sloping edge.

16. The marine instrument display mount of claim 15 wherein the sloping edge forms an angle with the bottom plate of between about 20° and 70°.

17. The marine instrument display mount of claim 13 wherein the foot sidewalls have at least one drain opening therethrough that comprises said drain.

18. The marine instrument display mount of claim 17 wherein the bottom plate is sloped to channel fluid flow to the drain opening.

19. The marine instrument display mount of claim 13 further comprising an electrically powered marine instrument.

20. The marine instrument display mount of claim 13 wherein the bottom plate is inclined during operation.

* * * * *